H. B. HAMMON.
Hand-Seeder.

No. 15,696.

Patented Sept. 9, 1856.

UNITED STATES PATENT OFFICE.

H. B. HAMMON, OF BRISTOLVILLE, OHIO.

IMPROVEMENT IN HAND CORN-PLANTERS.

Specification forming part of Letters Patent No. 15,696, dated September 9, 1856.

*To all whom it may concern:*

Be it known that I, HEMAN B. HAMMON, of Bristolville, in the county of Trumbull and State of Ohio, have invented a new and useful Improvement in Hand Corn-Planters; and I do hereby declare that the following is a full, clear, and exact description of the same, reference being had to the accompanying drawings, forming part of this specification, in which—

Figure 1:
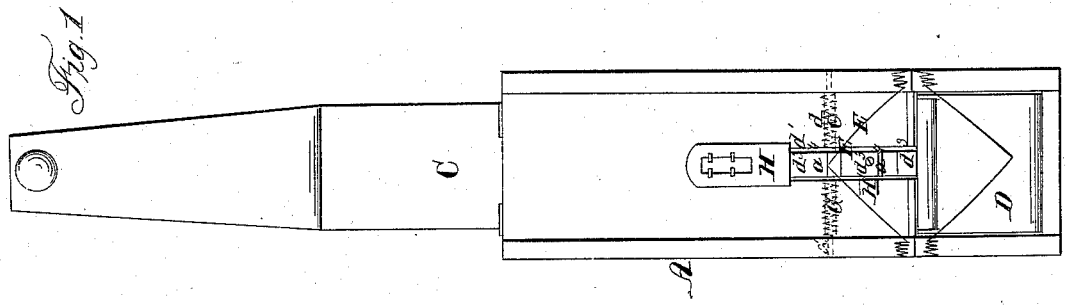
Figure 2:
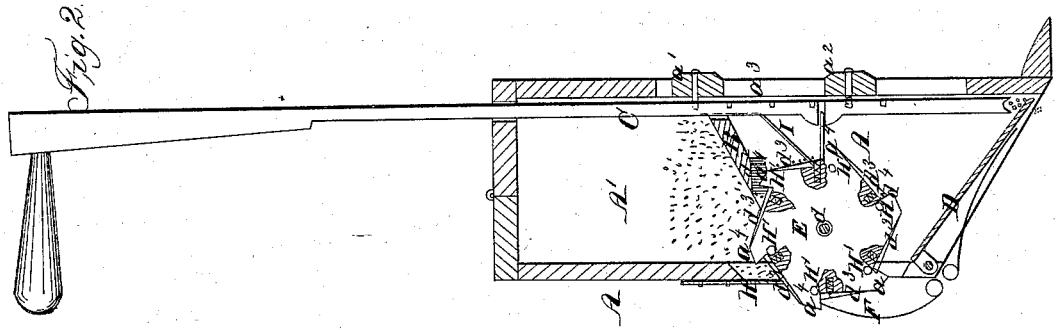

Figure 1 is a back view of a corn-planter constructed after my invention. Fig. 2 is a vertical central section of the same.

Similar letters of reference indicate corresponding parts in both figures.

My invention relates to a novel arrangement for effecting the deposit of the seed into the lower end of the tube, ready for being forced into the soil by the plunger, whereby all liability of clogging and bruising the seed is prevented and increased simplicity and certainty in the planting operation secured and labor in operating saved.

To enable others skilled in the art to make and use my invention, I will proceed to describe its construction and operation.

A is a seed-tube, made of square or other form and divided near the center of its length into two compartments, $A'$ $A^2$, by an inclined partition, B.

C is an ordinary plunger, arranged to play freely up and down between the front end of the partition B and front side of the tube. It has two stops, $a'$ $a^2$, which play in a slot, $a^3$, and serve for controlling its up and down movements.

D is a hinged spring-plate forming the bottom of the tube. It is forced open, so as to allow the seed to escape as the plunger descends.

E is a hexagonal or other many-sided wheel with offsets $a^4$ $a^4$ $a^4$ $a^4$ $a^4$ $a^4$ on its periphery. It is arranged on a shaft, $d$, and revolves through a slit, $d'$, in the back side of the lower portion of the seed-tube, and also one, $d^2$, in the bottom of the hopper. Each side of the wheel E is made by the offset $a^4$ to serve as a receptacle for seed as it falls from the hopper $A^2$, and is provided with a yielding surface-plate, $d^3$, so that in case the seed should be too large or many in number they shall not be bruised, and also that their discharge into the end of the tube shall be facilitated. A brush, $e$, is also provided, as shown, for scraping off surplus seed and preventing bruising or clogging.

F is a stop-spring for preventing the wheel revolving backward as the plunger is raised. G G are two spiral springs on the shaft of the wheel E for preventing the wheel binding in the slit $d'$.

H is a self-adjusting stop-plate on the rear side of the seed-tube, just above the wheel E, as shown. This plate slides up as the wheel turns and allows the offsets to pass into the seed-tube, and then instantly falls and prevents the escape of the seed through the slit $d'$.

$H'$ $H'$ are pins in the face of the wheel E, and I a spring-trigger on the plunger, which, as the plunger descends, strikes one of the pins and turns the wheel a sixth of a revolution, and thereby the offset which is under the slit in the partition B is caused to pass from under the same with seed and discharge the same into the end of the tube. At the same moment another offset passes under the slit $d'$, ready for conveying seed from the hopper into the tube.

The trigger I is so arranged that as the plunger is forced down it is caused to act against the pin; but as the plunger is raised the pin acts against it and causes it to recede and stand flush with the face of the plunger, and thus allow of its being raised without causing the wheel to turn backward.

The machine is operated by simply taking the plunger in the hand, setting the machine upon the ground, and forcing the plunger into the soil. As the plunger descends it forces seed which may be in the tube into the soil, and at the same time causes the wheel to turn a sixth of a revolution and deposit seed into the end of the tube for another descent of the plunger. Thus the operation continues until the field is planted.

By employing the wheel E for conveying the seed into the end of the seed-tube all the disadvantage arising from the use of a flat slide is avoided, as the seed falls upon the periphery of the wheel and is carried round to the proper place for discharging without meeting with any obstruction, and by having a number of offsets the necessity of employing a strong spring to throw the wheel back after it has deposited seed into the tube is avoided, and also the labor which would be required to overcome said spring in pressing down the plunger saved.

What I claim as my invention, and desire to secure by Letters Patent, is—

The employment of a hexagonal or many-sided revolving wheel, E, having offsets $a^4$ $a^4$ $a^4$ $a^4$ $a^4$, applied in connection with the plunger and seed-tube, substantially as and for the purpose herein set forth.

HEMAN B. HAMMON.

Witnesses:
 JACOB HAMMOND,
 WM. H. HOWE.